United States Patent [19]

Curtis et al.

[11] 4,235,197

[45] Nov. 25, 1980

[54] SURFACE DECKING

[76] Inventors: Carl F. Curtis, R.R. #1, Effingham, Ill. 62401; Edward D. Curtis, 1408 Techny La., Louisville, Ky. 40222

[21] Appl. No.: 971,998

[22] Filed: Dec. 20, 1978

Related U.S. Application Data

[63] Continuation of Ser. No. 727,458, Sep. 28, 1976, abandoned.

[51] Int. Cl.³ .............................................. A01J 1/00
[52] U.S. Cl. ..................................... 119/28; 52/674; 119/19
[58] Field of Search ................ 119/1, 19, 28; 52/673, 52/674, 675

[56] References Cited

U.S. PATENT DOCUMENTS

| | | | |
|---|---|---|---|
| 927,467 | 7/1909 | Fargo | 119/28 |
| 1,306,339 | 6/1919 | Kass | 52/675 |
| 2,934,934 | 6/1960 | Berliner | 52/674 |
| 3,046,617 | 7/1962 | Grayboff | 52/674 X |
| 3,458,168 | 7/1969 | White | 52/674 X |
| 3,699,926 | 10/1972 | Stockl | 119/28 |
| 3,726,255 | 4/1973 | Marr | 119/28 X |
| 3,760,769 | 9/1973 | Erfeling | 119/19 X |
| 3,837,319 | 9/1974 | Lehe | 119/28 |
| 3,965,863 | 6/1976 | Scott | 119/1 |
| 3,995,593 | 12/1976 | Bowser | 119/28 |
| 4,048,960 | 9/1977 | Barnidge et al. | 119/28 |

*Primary Examiner*—Louis G. Mancene
*Assistant Examiner*—G. Lee Skillington
*Attorney, Agent, or Firm*—Richard L. Johnston

[57] ABSTRACT

A surface decking or mat-like sheet material is provided having a lower surface with generally flat portions adapted to lie on a floor, ground or other generally flat surface, and an upper surface having a plurality of parallel spaced unidirectional recessed passageways separated by upwardly extending portions having spaced parallel unidirectional sides which also form the sides of said passageways, said recessed passageways having bottom portions extending between said parallel sides, the exterior sides of said bottom portions constituting said generally flat portions of said flat surface, said bottom portions containing a plurality of spaced openings extending through said lower surface, and said upper surface between said passageways containing a plurality of spaced openings having upwardly extending rims which act as bearing surfaces for animals, persons, or objects in contact therewith.

9 Claims, 5 Drawing Figures

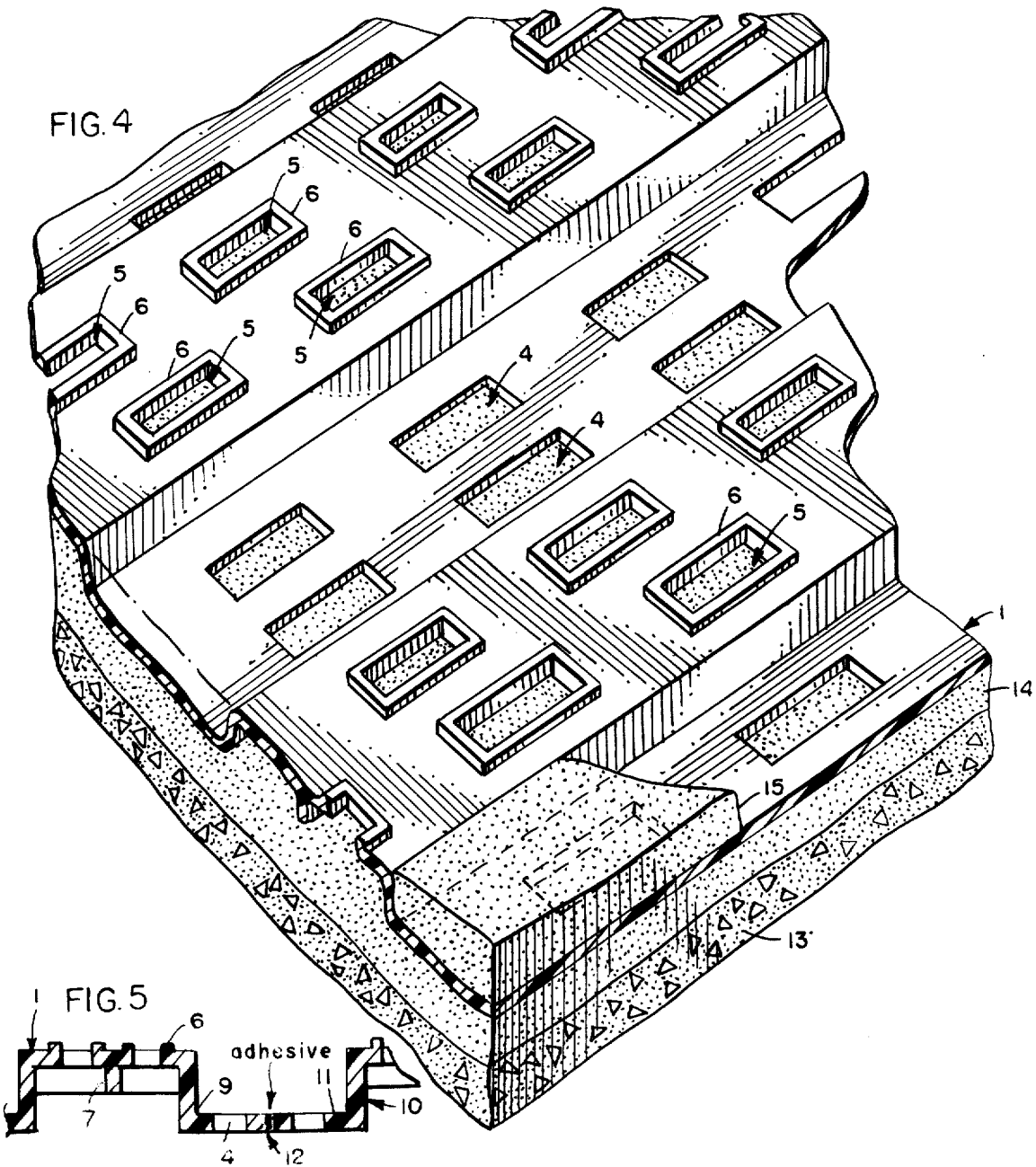

4,235,197

SURFACE DECKING

This is a continuation of application Ser. No. 727,458, filed Sept. 28, 1976, abandoned.

BACKGROUND

Various suggestions have been made heretofore in the art to provide flooring structures which are suitable for animals as disclosed in U.S. Pat. Nos. 1,874,644; 2,327,624; 3,461,844; 3,633,548; 3,699,926; 3,722,473; 3,771,495 and 3,824,960.

Some of these structures are directed primarily toward the prevention of slipping and others are directed toward drainage problems.

It is believed that there is a need in the art for a type of surface decking which can be used not only in animal stalls or as a decking surface in housing for animals, but also which can be employed in industrial areas and which is effective in preventing slippage while at the same time providing drainage.

OBJECTS

One of the objects of this invention is to provide surface decking in the form of a resilient sheet material which can be employed in animal housing as well as for other applications and which is effective in an antislip capacity and in also providing drainage where necessary.

Another object of the invention is to provide surface decking of the type described which can be manufactured in the form of panels and can be cut to various sizes in order to accommodate different sized areas.

Still another object of the invention is to provide a surface decking of the type described which can be fabricated from readily available raw materials which are highly resistant to attrition and to exposure of contaminating fluids.

Other objects and advantages of the invention will appear from the following description in conjunction with the accompanying drawings.

THE DRAWINGS

In the drawings:

FIG. 2 is an end view taken along the line 2,2 of FIG. 1, with parts broken away, of a section of the panel shown in FIG. 1;

FIG. 3 is a partial cross sectional view taken along the line 3,3 of FIG. 1 showing a detail of construction of the embodiment illustrated in FIG. 1, and also illustrating the manner in which the embodiment shown in FIG. 1 can be used;

FIG. 4 is a partial perspective view of the embodiment shown in FIG. 1; and

FIG. 5 is a partial sectional view showing the way in which two panels of the type illustrated in FIG. 1 can be mounted in butted relationship.

BRIEF SUMMARY OF THE INVENTION

Figure 1:
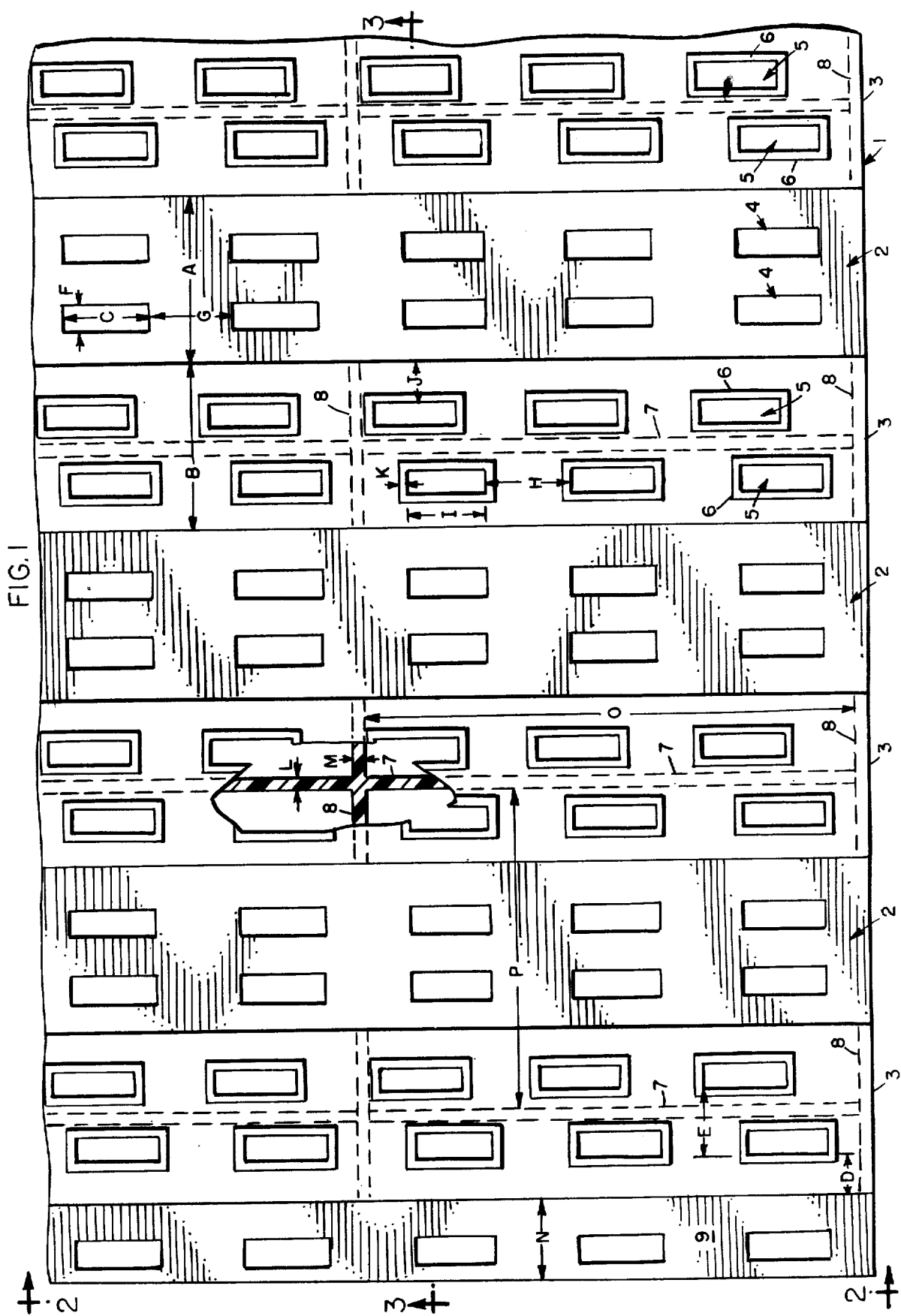
FIG. 1 is a plan view, with parts broken away, of a surface decking panel illustrating an embodiment of the invention.

In accordance with the invention a surface decking or mat-like sheet material is provided having a lower surface with generally flat portions adapted to lie on a floor, ground or other generally flat surface, and an upper surface having a plurality of parallel spaced unidirectional recessed passageways separated by upwardly extending portions having spaced parallel unidirectional sides which also form the sides of said passageways, said recessed passageways having bottom portions extending between said parallel sides, the exterior sides of said bottom portions constituting said generally flat portions of said flat surface, said bottom portions containing a plurality of spaced openings extending through said lower surface, and said upper surface between said passageways containing a plurality of spaced openings having upwardly extending rims which act as bearing surfaces for animals, persons, or objects in contact therewith.

DETAILED DESCRIPTION OF THE INVENTION

According to a preferred embodiment of the invention as illustrated in the drawings, the surface decking is preferably manufactured in the form of panels eight feet long and four feet wide although the particular dimensions are not critical. The panels are formed from a resilient material such as an organic polymer, e.g., polyvinyl chloride, polyesters, and polyolefins such as polyethylene or polyisopropylene. Other materials such as various types of synthetic and natural rubbers can be used.

The resilient material is molded or otherwise shaped so as to contain alternating recessed and projecting portions, the recessed portions forming passageways on the upper surface and forming a supporting area on the lower surface. The passageways extend unidirectionaly from one side of the panel to the other and are spaced from one another approximately equal distance. The sides of the passageways extend upwardly, preferably vertically, to form projecting portions. These projecting portions have openings therein with upwardly extending rims around the upper surfaces so that the top area of the projecting portions and said rims of said openings act as bearing surfaces for animals, persons or objects in contact with the upper surface of said decking.

The openings in the projecting portions extend through the decking and preferably have polygonal geometric shape which may be, for example, 3, 4, 5, 6, 7 or 8 sided, but is preferably rectangular with two sides longer than the other two sides. The passageways between the projecting portions also contain openings which extend through the bottom surface of the decking. These openings likewise preferably have a polygonal geometric shape such as, for example, 3, 4, 5, 6, 7 or 8 sides. Rectangular openings with two sides longer than the other two sides are preferred.

In the structure illustrated in FIGS. 1 to 4 of the drawings, the decking generally illustrated at 1 comprises passageways 2 and projecting portions 3. The passageways 2 contain pairs of rectangular openings 4 which extend through the decking.

In the embodiment shown, the openings 4 are aligned from one end to the other of the decking lengthwise and are also aligned transversely from side to side of the decking.

The projecting portions 3 contain a plurality of openings 5 each having an upwardly extending rim 6. These openings are aligned lengthwise but are staggered transversely from side to side of the decking. The staggering of the rimmed openings which act as bearing surfaces provides better accommodation for animal hoofs where the decking is used, for example, in cow barns or horse barns, and also assists in preventing slipping of animals or of persons where the decking is used in other facilities. The openings 5 preferably extend through the decking so that these openings as well as the openings 4 in the passageways 3, facilitate drainage.

A further feature of the invention resides in the provision of reinforcing ribs 7 which are integrally formed and project downwardly from the areas between the openings 5. These ribs extend lengthwise from one end to the other of the decking and serve to reinforce the central area of the projecting portions which provide the upper bearing surfaces of the mat.

Another series of ribs 8 extends transversely across each of the projecting portions at intervals to provide enhanced reinforcement from side to side of the decking.

Another feature of the invention is the provision of a half-width passageway 9 at the sides of the decking as shown in FIG. 1. This permits two or more decking panels to be joined together in a butted relationship as shown, for example, in FIG. 5 where a panel 1 is joined to a panel 10 through the edge portion 9 of panel 1 and an edge portion 11 of panel 10 by means of an adhesive bond generally indicated at 12. The adhesive may consist of any adhesive which will bond together the two edge portions as, for example, polyester cements, epoxy cements or cyanacrylate cements. The abutting sheets of decking can also be staggered with respect to one another in any one of a number of configurations.

Due to the symmetry of the decking it can be severed into smaller components, for example, into four pieces of approximately the same size. Although not shown in the drawings, it will be understood that the side of the decking opposite the side containing half passageway in FIG. 1 has a mirror image.

While the dimensions of the various components of the decking are subject to variation, typical dimensions which are given on the drawings by means of letters are as follows: A=6"; B=6"; C=3"; D=1-5/16"; E=1¾"; F=1"; G=1"; H=3"; I=3"; J=1-5/16"; K=¼"; L=⅛"; M=⅝"; N=3"; O=18"; P=12"; Q=¾"; R=¾"; S=2¾"; T=¼"; U=⅝".

While the decking can be used as a general floor mat where drainage problems are involved as in animal stalls or pens, it is preferable to install the decking on a base of gravel 13 which is covered with sand or similar granular material 14 which is capable of providing rapid drainage. Sand or similar material 15 is also placed in the passageways 3 so as to practically fill such passageways and provide a surface of approximately the same depth as the height of the projecting portions between the passageways in the manner shown in FIG. 3.

In practicing the invention, although two or more decking panels of the type described can be joined together by means of an adhesive in the manner previously explained, it will be understood that other methods of joining the panels together can be employed including, for example, but without limitation, joining the panels by an interlocking (dove-tail) joint or by joining the panels by the use of a dielectric welding process of a type heretofore used for joining plastic materials including polymer resin materials.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. Surface decking comprising a molded, unitary, resilient sheet material formed throughout with a plurality of parallel rectangular corrugations of substantial length, width and thickness, the bottom parts of said corrugations forming a lower surface adapted to lie on a floor, ground or other generally flat surface and the upper parts of said corrugations forming an upper surface, a plurality of rows of spaced openings in the bottom part of each corrugation, and a plurality of rows of spaced openings in the upper part of each corrugation, said rows on the upper part are parallel to the length of the corrugation, said last named spaced openings having upwardly extending rims, the tops of said rims are of substantial width sufficient to act as bearing surfaces for animals, persons or objects in contact with the upper surface of said decking, and downwardly extending, reinforcing ribs disposed on the opposing side of the bearing surface, said ribs are centrally located between each pair of adjacent rows of rimmed openings.

2. A decking as claimed in claim 1 in which said openings in said lower surface are aligned longitudinally.

3. A decking as claimed in claim 1 in which said rimmed openings in said upper surface are aligned longitudinally.

4. A decking as claimed in claim 1 in which said openings in said lower surface are aligned longitudinally and transversely.

5. A decking as claimed in claim 1 in which said rimmed openings in said upper surface are aligned longitudinally and staggered transversely.

6. A decking as claimed in claim 1 in which said rimmed openings in said upper surface area have a polygonal geometric shape.

7. A decking as claimed in claim 1 in which said rimmed openings in said upper surface area have a rectangular geometric shape.

8. A decking as claimed in claim 1 which is in the form of a rectangular panel having greater length than width wherein said openings in said lower surface are aligned transversely and longitudinally of said panel in spaced pairs and said rimmed openings are polygonal in shape and are aligned longitudinally and staggered transversely in spaced pairs, the opposite sides of said panel terminating in said lower surface at approximately one-half of the normal corrugation width so that the edge line is straight and extends longitudinally with only a single series of longitudinally aligned holes therein whereby another identical panel can be secured in butted relationship at said edge line to produce a matching combination of said panels.

9. A decking as claimed in claim 1 mounted on a supporting surface with sand or other inert granular material covering said supporting surface and lower surface in said decking.

* * * * *